(12) United States Patent
Ma et al.

(10) Patent No.: US 9,897,852 B2
(45) Date of Patent: Feb. 20, 2018

(54) LIQUID CRYSTAL DISPLAY APPARATUS AND BACKLIGHT MODULE

(71) Applicant: BOE TECHNOLOGY GROUP CO., LTD., Beijing (CN)

(72) Inventors: Yongda Ma, Beijing (CN); Jian Xu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/785,820

(22) PCT Filed: Apr. 29, 2015

(86) PCT No.: PCT/CN2015/077773
§ 371 (c)(1),
(2) Date: Oct. 20, 2015

(87) PCT Pub. No.: WO2016/110026
PCT Pub. Date: Jul. 14, 2016

(65) Prior Publication Data
US 2016/0342026 A1 Nov. 24, 2016

(30) Foreign Application Priority Data
Jan. 8, 2015 (CN) .................... 2015 2 0013404 U

(51) Int. Cl.
*G02F 1/13357* (2006.01)
*G02F 1/1335* (2006.01)

(52) U.S. Cl.
CPC .............................. *G02F 1/133608* (2013.01)

(58) Field of Classification Search
CPC ..................... G02F 1/133606; G02F 1/133608
(Continued)

(56) References Cited

U.S. PATENT DOCUMENTS 6,552,761 B1 * 4/2003 Seo .................... G02F 1/133308
349/58
7,740,394 B2 * 6/2010 Cheng ............... G02F 1/133606
349/58

(Continued)

FOREIGN PATENT DOCUMENTS

CN 101435948 A 5/2009
CN 202330936 U 7/2012
(Continued)

OTHER PUBLICATIONS

International Search Report and Written Opinion from PCT Application Serial No. PCT/CN2015/077773, dated Jan. 8, 2015, 10 pages.

*Primary Examiner* — Julie Bannan
(74) *Attorney, Agent, or Firm* — Kinney & Lange, P.A.

(57) ABSTRACT

Embodiments of the present invention relate to a display technical field and disclose a liquid crystal display apparatus and a backlight module thereof. The backlight module comprises: a backboard having a bottom plate and a plurality of side plates to form a light source receiving chamber; a plurality of light sources located in the light source receiving chamber and mounted on the bottom plate; an optical film located in the light source receiving chamber, edges of the optical film being mounted on the backboard; a plurality of supporting strips located at a side of the optical film facing toward the bottom plate and made of transparent elastic material, a surface of the supporting strips facing toward the optical film abutting against a surface of the optical film facing toward the bottom plate and two ends of the supporting strip being mounted on two opposing side plates of the backboard respectively. The backlight module is a direct type backlight module, and the supporting strips are in a line contact or surface contact with the optical film, thus stress concentration will not occur between the supporting strips (Continued)

and the optical film. In the above backlight module, the optical film is structurally stable while used as a diffusion element and may increase the display quality of the liquid crystal display apparatus.

20 Claims, 2 Drawing Sheets

(58) Field of Classification Search
USPC .......................................................... 362/97.4
See application file for complete search history.

(56) References Cited

U.S. PATENT DOCUMENTS

| | | | | |
|---|---|---|---|---|
| 8,031,289 | B2* | 10/2011 | Naritomi | G02F 1/133608 349/58 |
| 8,228,458 | B2* | 7/2012 | Kamada | G02B 5/0242 349/58 |
| 8,625,045 | B2* | 1/2014 | Li | G09F 13/04 349/58 |
| 2007/0139574 | A1* | 6/2007 | Ko | G02F 1/133608 349/58 |
| 2007/0190889 | A1* | 8/2007 | Lee | C23C 14/042 445/47 |
| 2009/0128741 | A1* | 5/2009 | Peng | G02F 1/133603 349/67 |
| 2009/0161345 | A1* | 6/2009 | Hsu | G02F 1/133308 349/58 |
| 2015/0029696 | A1* | 1/2015 | Ryu | G02F 1/133608 362/97.1 |

FOREIGN PATENT DOCUMENTS

| | | |
|---|---|---|
| CN | 202647612 U | 1/2013 |
| CN | 202835065 U | 3/2013 |
| CN | 103021296 A | 4/2013 |
| CN | 103672600 A | 3/2014 |
| JP | 2006126583 A | 5/2006 |

* cited by examiner

LIQUID CRYSTAL DISPLAY APPARATUS AND BACKLIGHT MODULE

CROSS-REFERENCE TO RELATED APPLICATION

This application is a Section 371 National Stage Application of International Application No. PCT/CN2015/077773, filed on Apr. 29, 2015, entitled "Liquid Crystal display Apparatus and Backlight Module", which has not yet published, which claims priority to Chinese Application No. 201520013404.4, filed on Jan. 8, 2015, incorporated herein by reference in their entirety.

BACKGROUND OF THE INVENTION

Field of the Invention

Embodiments of the present invention relate to a field of display technology, in particular, to a liquid crystal display apparatus and a backlight module thereof.

Description of the Related Art

A liquid crystal display apparatus has been widely used in a field such as display technology or the like and is dominating in various display apparatus due to its characteristics such as light weight, thin thickness, low power consumption, less radiation, etc.

Since a liquid crystal panel of the liquid crystal display apparatus does not emit light by itself, it is required to provide a backlight module in the liquid crystal display apparatus to provide a light source for the liquid crystal panel. At present, a high brightness backlight module typically employs a direct type backlight in which a diffusion plate is generally used as an optical diffusion structure and a supporting structure for an optical film. However, an additional supporting structure is required to be provided to support the diffusion plate due to its heavy weight, causing a contour of the additional supporting structure to be presented on a picture around the additional supporting structure when the display apparatus is displaying the picture.

Thus there is a tend to replace the diffusion plate with an optical film in the development of the display technology. However, the optical film has a low mechanical strength itself and there is a large limitation when choosing a supporting structure for the optical film.

Therefore, one of problems to be solved by those skilled in the art is how to provide a backlight module, which has a stable structure and is able to ensure the display quality of the liquid crystal display apparatus when an optical film is used as an optical diffusion structure therein, and a liquid crystal display apparatus including the backlight module.

SUMMARY OF THE INVENTION

Embodiments of the present invention provide a liquid crystal display apparatus and a backlight module thereof. In the backlight module, the optical film is used as a diffusion element and the backlight module is stable in structure and may improve the display quality of the liquid crystal display apparatus.

In order to achieve the above purposes, embodiments of the present invention provide a backlight module comprising:

a backboard having a bottom plate and a plurality of side plates, the bottom plate and the plurality of side plates forming a light source receiving chamber;

a plurality of light sources located in the light source receiving chamber and mounted on the bottom plate;

an optical film located in the light source receiving chamber, the optical film being mounted on the backboard; and a plurality of supporting strips located on a side of the optical film facing toward the bottom plate and made of transparent elastic material, a surface of the supporting strip facing toward the optical film abutting against a surface of the optical film facing toward the bottom plate and two ends of the supporting strip being mounted on two opposing side plates of the backboard respectively.

The above backlight module is a direct type backlight module. The edges of the optical film are mounted on the backboard and the middle portion thereof is supported by the plurality of supporting strips. The supporting strip is made of transparent elastic material, thus it has a little influence on the uniformity of light in the backlight module; the supporting strip is flexible, and the supporting strips are in a line contact or surface contact with the optical film when the optical film is supported by the plurality of supporting strips, thus stress concentration will not occur between the supporting strips and the optical film; further, when the optical film is supported by the plurality of supporting strips having a certain flexibility, a force between the supporting strips and the optical film can be buffered, so that the structural stability of the backlight module may be improved. Thus, with the above backlight module in which an optical film is used as a diffusion element, the structure of the backlight module is stable and the display quality of the liquid crystal display apparatus can be improved.

According to an embodiment, the plurality of supporting strips comprise a plurality of first supporting strips in parallel with each other and a plurality of second supporting strips in parallel with each other, and the first supporting strips and the second supporting strips cross with each other.

According to an embodiment, opposing side plates of the backboard are provided with a pair of through holes corresponding to each of the supporting strips, each of the supporting strips extending through a corresponding pair of through holes.

According to an embodiment, each of two ends of the supporting strip is fixed on a surface of the side plate of the backboard facing away from the light source receiving chamber.

According to an embodiment, two ends of the supporting strip are provided with fixing hole respectively, and the surfaces of the opposing side plates of the backboard facing away from the light source receiving chamber are provided with fixing studs, which correspond to the fixing holes in the supporting strip and are connected with the fixing holes in the supporting strip in a plug-in fit manner, respectively.

According to an embodiment, the two ends of each of the supporting strips are provided with fixing holes respectively and the two ends of each of the supporting strips are mounted on opposing side plates of the backboard via fastening screws or rivets, respectively.

According to an embodiment, two ends of each of the supporting strips are connected with opposing side plates of the backboard through snapping engagement members.

According to an embodiment, the optical film are mounted on the side plates of the backboard at edges of the optical film.

According to an embodiment, the optical film is provided with a plurality of fixing holes at its edges, and the side plates of the backboard are provided with fixing studs corresponding to the fixing holes in the optical film respectively, and each fixing hole and its corresponding fixing stud are connected with each other in a plug-in fit manner.

According to an embodiment, the optical film is connected with the side plates through a frame provided at the edges of the optical film.

According to an embodiment, the optical film is provided with a plurality of fixing holes at its edges, and the frame is provided with fixing studs corresponding to the fixing holes in the optical film respectively, and each fixing hole and its corresponding fixing stud are connected with each other in a plug-in fit manner; and the frame is provided with slots for engaging with the side plates of the backboard.

According to an embodiment, the frame is formed with a supporting surface for supporting a display panel.

According to an embodiment, the supporting strip is removably mounted on two opposing side plates of the backboard, so as to be removed from outside of the backlight module.

Other Embodiments of the present invention also provides a liquid crystal display apparatus comprising a backlight module according to any of above embodiments.

DETAILED DESCRIPTION OF PREFERRED EMBODIMENTS OF THE INVENTION

Hereafter, the technical solutions in the embodiments of the present invention will be clearly and completely described with reference to the accompanying drawings in the embodiments of the present invention. Apparently, the described embodiments are merely a part rather than all of the embodiments of the present invention. All other embodiments obtained by those skilled in the art based on the embodiments of the present invention without creative efforts shall fall within the protection scope of the present invention.

Figure 1:
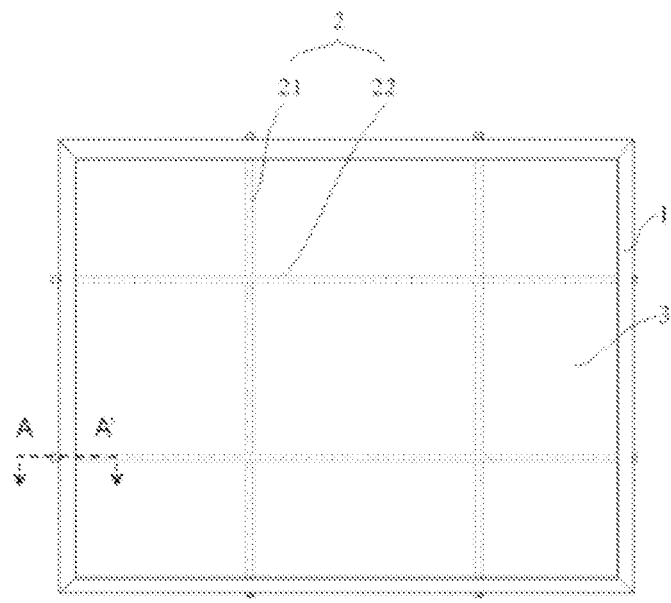
FIG. 1 is a schematic structural view of a backlight module according to an embodiment of the present invention.
Figure 2:
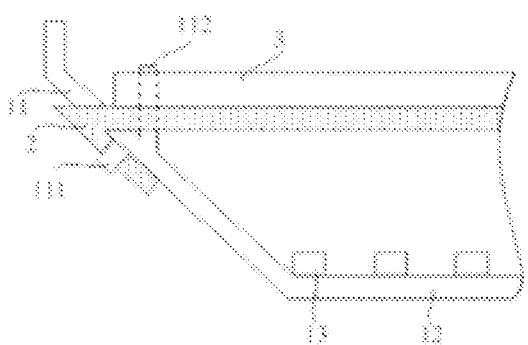
FIG. 2 is a schematic structural view showing a cross section of the backlight module taken along line A-A in FIG. 1.

Referring to FIGS. 1 and 2, a backlight module according to an embodiment of the present invention comprises: a backboard 1 having a bottom plate 12 and a plurality of side plates 11 to form a light source receiving chamber; a plurality of light sources 13 located in the light source receiving chamber and mounted on the bottom plate 12; an optical film 3 located in the light source receiving chamber, edges of the optical film 3 being mounted on the backboard 1; a plurality of supporting strips 2 located on a side of the optical film 3 facing toward the bottom plate 12 and made of transparent elastic material. A surface of each of the supporting strips 2 facing toward the optical film 3 abuts against a surface of the optical film 3 facing toward the bottom plate 12 and two ends of each of the supporting strips 2 are mounted on two opposing side plates 11 of the backboard 1.

As shown in FIGS. 1 and 2, the backlight module is a direct type backlight module. The edges of the optical film 3 are mounted on the backboard 1 and the middle portion thereof is supported by the plurality of supporting strips 2. The supporting strip 2 is made of transparent elastic material, thus it has a little influence on the uniformity of light in the backlight module; the supporting strip 2 is flexible, and the supporting strips 2 are in a line contact or surface contact with the optical film 3 when the optical film 3 is supported by the plurality of supporting strips 2, thus stress concentration will not occur between the supporting strips 2 and the optical film 3, further, when the optical film 3 is supported by the plurality of supporting strips 2 having a certain flexibility, a force between the supporting strips 2 and the optical film 3 can be buffered, so that the structural stability of the backlight module may be improved. Thus, in the above backlight module in which the optical film is used as a diffusion element, the structure of the backlight module is stable and the display quality of the liquid crystal display apparatus can be improved.

In an embodiment, as shown in FIG. 1, the plurality of supporting strips 2 comprise a plurality of first supporting strips 21 in parallel with each other and a plurality of second supporting strips 22 in parallel with each other. The first supporting strips 21 and the second supporting strips 22 cross with each other. The crossed first supporting strips 21 and second supporting strips 22 may form a gridded supporting structure on an inner side of the side plates 11 of the backboard 1 facing toward the light source receiving chamber, so that the optical film 3 can be well supported.

In another embodiment, as shown in FIG. 2, in the backlight module, multiple paired through holes corresponding to the supporting strips 2 respectively are provided in the side plates 11 of the backboard 1, and each of the supporting strips 2 extends through a corresponding pair of through holes.

In an further embodiment, each of two ends of the supporting strip 2 are fixed on a surface of the side plate 11 of the backboard 1 facing away from the light source receiving chamber, respectively. Thereby, when the liquid crystal panel of the liquid crystal display apparatus is hung in a vertical direction, the optical film 3 is also hung in the vertical direction. In that case, the optical film 3 may less rely on the supporting strip 2 and the connection requirement will be met only through the connection between the optical film 3 and the side plates 11 of the backboard 1. Thus, the connection between two ends of each of the supporting strips 2 and the side plates 11 may be removed or released and then each of the supporting strips 2 may be withdrawn from the backboard 1 through the through holes in the side plates 11 of the backboard 1, so that the influence of the supporting strip 2 on the uniformity of light in the backlight module may be further decreased and thus the display quality of the liquid crystal display apparatus may be further improved.

Specifically, the connection between the supporting strip 2 and the side plate 11 may be selected from several manners as follows.

As a first manner, as shown in FIG. 2, two ends of each of the supporting strips 2 are provided with fixing holes respectively, and the side plates 11 of the backboard 1 are provided with fixing studs 111 which correspond to and are connected with the fixing holes in the supporting strips 2 in a plug-in fit manner, respectively.

AS a second manner: two ends of each of the supporting strips 2 are provided with fixing holes respectively and mounted on the side plates 11 of the backboard 1 via fastening screws or rivets.

As a third manner: two ends of each of the supporting strips 2 are connected with the side plates 11 of the backboard 1 through snapping engagement members.

Apparently, there are other manners for connecting the supporting strip 2 and the side plate 11, which are omitted here.

In an embodiment, edges of the optical film 3 may be mounted on the side plates of the backboard 1.

Specifically, in an example, as shown in FIG. 2, the optical film 3 is provided with a plurality of fixing holes at its edges, and the side plates 11 of the backboard 1 are provided with fixing studs 112 which correspond to and are connected with the fixing holes in the optical film 3 in a plug-in fit manner, respectively.

Figure 3:
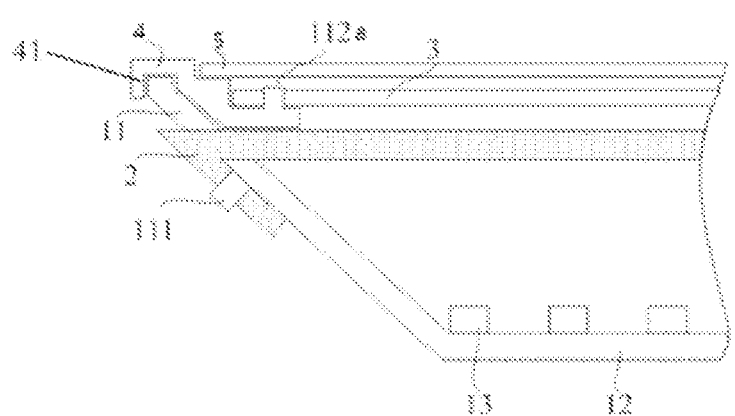
FIG. 3 is a schematic structural view showing a cross section of a backlight module according to another embodiment of the present invention.

In another example, as shown in FIG. 3, the optical film 3 is provided with a frame 4 at its edges and the optical film 3 is connected with the side plates through the frame 4.

Specifically, the optical film 3 is provided with a plurality of fixing holes at its edges, and the frame 4 is provided with fixing studs 112*a* which correspond to the fixing holes in the optical film 3 respectively. Each fixing hole and its corresponding fixing stud are connected with each other in a plug-in fit manner, and the frame 4 is provided with slots 41 for engaging with the side plates 11 of the backboard 1, so as to connect the optical film 3 with the side plates 11 through the frame 4.

Specifically, a supporting surface for supporting a display panel 5 may be formed on the frame 4, so as to support the display panel 5.

Further, an embodiment of the present invention provides a liquid crystal display apparatus comprising a backlight module according to any of the above embodiments. The liquid crystal display apparatus has a light weight and a high display quality.

Obviously, various modifications and changes may be made to the embodiments of the present invention by those skilled in the art without departing from the spirit and scope of the present invention. Thus, these modifications and changes are intended to be included in the present invention if they fall into the claims of the present invention and the equivalent technology thereof.

What is claimed is:

1. A backlight module comprising:
   a backboard having a bottom plate and a plurality of side plates, the bottom plate and the plurality of side plates being configured to form a light source receiving chamber;
   a plurality of light sources located in the light source receiving chamber and mounted on the bottom plate;
   an optical film located in the light source receiving chamber, the optical film being mounted to the backboard; and
   a plurality of supporting strips located on a side of the optical film facing toward the bottom plate and made of transparent elastic material, a surface of each supporting strip facing toward the optical film abutting against a surface of the optical film facing toward the bottom plate and two ends of each supporting strip being mounted on two opposing side plates of the backboard respectively;
   wherein opposing side plates of the backboard are provided with a pair of through holes corresponding to each of the supporting strips, each of the supporting strips extending through a corresponding pair of through holes; and
   wherein the two ends of each supporting strip are provided with fixing holes respectively, and the surfaces of the opposing side plates of the backboard facing away from the light source receiving chamber are provided with fixing studs, which correspond to the fixing holes in each supporting strip and are connected with the fixing holes in each supporting strip in a plug-in fit manner, respectively.

2. The backlight module according to claim 1, wherein the plurality of supporting strips comprise a plurality of first supporting strips in parallel with each other and a plurality of second supporting strips in parallel with each other, and the first supporting strips and the second supporting strips cross with each other.

3. The backlight module according to claim 1, wherein the optical film is mounted on the side plates of the backboard at edges of the optical film.

4. The backlight module according to claim 3, wherein the optical film is provided with a plurality of fixing holes at its edges, and the side plates of the backboard are provided with fixing studs corresponding to the fixing holes in the optical film respectively, and each fixing hole and its corresponding fixing stud are connected with each other in a plug-in fit manner.

5. The backlight module according to claim 3, wherein the optical film is connected with the side plates through a frame provided at the edges of the optical film:
   wherein the optical film is provided with a plurality of fixing holes at its edges, and the frame is provided with fixing studs corresponding to the fixing holes in the optical film respectively, and each fixing hole and its corresponding fixing stud are connected with each other in a plug-in fit manner;
   wherein the frame is provided with slots for engaging with the side plates of the backboard; and
   wherein the frame is formed with a supporting surface for supporting a display panel.

6. A liquid crystal display apparatus comprising the backlight module according to claim 1.

7. A backlight module comprising:
   a backboard having a bottom plate and a plurality of side plates, the bottom plate and the plurality of side plates being configured to form a light source receiving chamber;
   a plurality of light sources located in the light source receiving chamber and mounted on the bottom plate;
   an optical film located in the light source receiving chamber, the optical film being mounted on the backboard; and
   a plurality of supporting strips located on a side of the optical film facing toward the bottom plate and made of transparent elastic material, a surface of each of the supporting strips facing toward the optical film abutting against a surface of the optical film facing toward the bottom plate and two ends of each of the supporting strips being mounted on two opposing side plates of the backboard respectively;
   wherein opposing side plates of the backboard are provided with a pair of through holes corresponding to each of the supporting strips, each of the supporting strips extending through a corresponding pair of through holes; and
   wherein the two ends of each of the supporting strips are provided with fixing holes respectively and mounted on the opposing side plates of the backboard via fastening screws or rivets, respectively.

8. The backlight module according to claim 7, wherein the plurality of supporting strips comprise a plurality of first supporting strips in parallel with each other and a plurality of second supporting strips in parallel with each other, and the first supporting strips and the second supporting strips cross with each other.

9. The backlight module according to claim 7, wherein:
each of the two ends of each of the supporting strips is fixed on a surface of the side plate of the backboard facing away from the light source receiving chamber; or each of the supporting strips is removably mounted on the two opposing side plates of the backboard, so as to be withdrawn from the exterior of the backlight module.

10. The backlight module according to claim 7, wherein the optical film is mounted on the side plates of the backboard at edges of the optical film.

11. The backlight module according to claim 10, wherein the optical film is provided with a plurality of fixing holes at its edges, and the side plates of the backboard are provided with fixing studs corresponding to the fixing holes in the optical film respectively, and each pair of corresponding fixing holes and fixing studs are connected with each other in a plug-in manner.

12. The backlight module according to claim 10, wherein the optical film is connected with the side plates through a frame provided at the edges of the optical film, wherein the optical film is provided with a plurality of fixing holes at its edges, and the frame is provided with fixing studs corresponding to the fixing holes in the optical film respectively, and each pair of corresponding fixing holes and fixing studs are connected with each other in a plug-in manner;
wherein the frame is provided with slots for engaging with the side plates of the backboard; and
wherein the frame is formed with a supporting surface for supporting a display panel.

13. A backlight module comprising:
a backboard having a bottom plate and a plurality of side plates, the bottom plate and the plurality of side plates being configured to form a light source receiving chamber;
a plurality of light sources located in the light source receiving chamber and mounted on the bottom plate;
an optical film located in the light source receiving chamber, the optical film being mounted on the backboard; and
a plurality of supporting strips located on a side of the optical film facing toward the bottom plate and made of transparent elastic material, a surface of each of the supporting strips facing toward the optical film abutting against a surface of the optical film facing toward the bottom plate and two ends of each of the supporting strips being mounted on two opposing side plates of the backboard respectively;
wherein opposing side plates of the backboard are provided with a pair of through holes corresponding to each of the supporting strips, each of the supporting strips extending through a corresponding pair of through holes;
wherein the two ends of each of the supporting strips are connected with the opposing side plates of the backboard through snapping engagement members.

14. The backlight module according to claim 13, wherein the plurality of supporting strips comprise a plurality of first supporting strips in parallel with each other and a plurality of second supporting strips in parallel with each other, and the first supporting strips and the second supporting strips cross with each other.

15. The backlight module according to claim 13, wherein:
each of the two ends of each of the supporting strips is fixed on a surface of the side plate of the backboard facing away from the light source receiving chamber; or each of the supporting strips is removably mounted on the two opposing side plates of the backboard, so as to be withdrawn from the exterior of the backlight module.

16. The backlight module according to claim 13, wherein the optical film is mounted on the side plates of the backboard at edges of the optical film, wherein the optical film is provided with a plurality of fixing holes at its edges, and the side plates of the backboard are provided with fixing studs corresponding to the fixing holes in the optical film respectively, and each pair of corresponding fixing holes and fixing studs are connected with each other in a plug-in manner.

17. The backlight module according to claim 13, wherein the optical film is connected with the side plates through a frame provided at the edges of the optical film, wherein the optical film is provided with a plurality of fixing holes at its edges, and the frame is provided with fixing studs corresponding to the fixing holes in the optical film respectively, and each pair of corresponding fixing holes and fixing studs are connected with each other in a plug-in manner;
wherein the frame is provided with slots for engaging with the side plates of the backboard; and
wherein the frame is formed with a supporting surface for supporting a display panel.

18. The backlight module according to claim 1, wherein:
each of the two ends of each of the supportings strip is fixed on a surface of the side plate of the backboard facing away from the light source receiving chamber; or each of the supporting strips is removably mounted on the two opposing side plates of the backboard, so as to be withdrawn from the exterior of the backlight module.

19. A liquid crystal display apparatus comprising a backlight module according to claim 13.

20. A liquid crystal display apparatus comprising a backlight module according to claim 7.

* * * * *